United States Patent [19]

Beyer

[11] Patent Number: 5,315,848
[45] Date of Patent: May 31, 1994

[54] WHEEL LOCK

[76] Inventor: Terrance L. Beyer, 1603 Barlow, Traverse City, Mich. 49684

[21] Appl. No.: 5,599

[22] Filed: Jan. 19, 1993

[51] Int. Cl.[5] ............................................. B60R 25/00
[52] U.S. Cl. ........................................ 70/18; 70/19; 70/226; 70/237; 188/32
[58] Field of Search ................ 70/14, 15, 18, 19, 225, 70/226, 209, 211, 212, 237, 238, 227, 259, 260; 188/32

[56] References Cited

U.S. PATENT DOCUMENTS

| | | | |
|---|---|---|---|
| 554,222 | 2/1896 | Hillhouse | 70/227 |
| 1,467,530 | 9/1923 | Clayton | 70/18 |
| 1,766,664 | 6/1930 | Meloy | 70/260 |
| 3,810,370 | 5/1974 | Jeppesen | 70/225 |
| 3,845,643 | 11/1974 | Barrett | 70/18 |
| 3,855,825 | 12/1974 | Pickard | 70/14 |
| 3,907,072 | 9/1975 | Shafer | 70/226 X |
| 3,988,910 | 11/1976 | Widen | 70/227 |
| 4,031,726 | 6/1977 | De Jager | 70/226 |
| 4,164,131 | 8/1979 | Desmond et al. | 70/14 |
| 4,175,410 | 11/1979 | Schwaiger | 70/226 |
| 4,441,586 | 4/1984 | Bernier | 70/19 X |
| 4,649,724 | 3/1987 | Raine | 70/225 X |
| 4,768,359 | 9/1988 | Wade | 70/14 |
| 4,804,070 | 2/1989 | Bohler | 188/32 |
| 4,819,462 | 4/1989 | Apsell | 70/14 |
| 4,833,442 | 5/1989 | Von Heck | 70/226 X |
| 4,878,366 | 11/1989 | Cox | 70/14 |
| 5,134,868 | 8/1992 | Bethards | 70/18 |
| 5,137,121 | 8/1992 | Leonard | 70/226 X |
| 5,176,013 | 1/1993 | Kutauskas | 70/226 X |
| 5,247,815 | 9/1993 | Caldwell | 70/18 X |

FOREIGN PATENT DOCUMENTS

| | | | |
|---|---|---|---|
| 0343814 | 11/1989 | European Pat. Off. | 70/226 |
| 2520683 | 8/1983 | France | 70/226 |
| 2548114 | 1/1985 | France | 70/260 |
| 423629 | 7/1947 | Italy | 70/227 |
| 0076348 | 5/1983 | Japan | 70/225 |
| 0076349 | 5/1983 | Japan | 70/225 |
| 265044 | 2/1927 | United Kingdom | 70/227 |
| 2039840 | 8/1980 | United Kingdom | 70/209 |
| 2184276 | 6/1987 | United Kingdom | 188/32 |

Primary Examiner—Lloyd A. Gall
Attorney, Agent, or Firm—Price, Heneveld, Cooper, DeWitt & Litton

[57] ABSTRACT

A security device for locking a wheel of a vehicle includes first and second generally L-shaped clamp members adjustably positioned on a transversely extending cross member. The L-shaped members are moved toward each other to clampingly engage a steering wheel or road wheel of a vehicle. A lock assembly is slideably disposed within an open end of one of the L-shaped clamp members. The lock assembly includes a lock pin which engages apertures, openings or holes in the cross member.

20 Claims, 2 Drawing Sheets

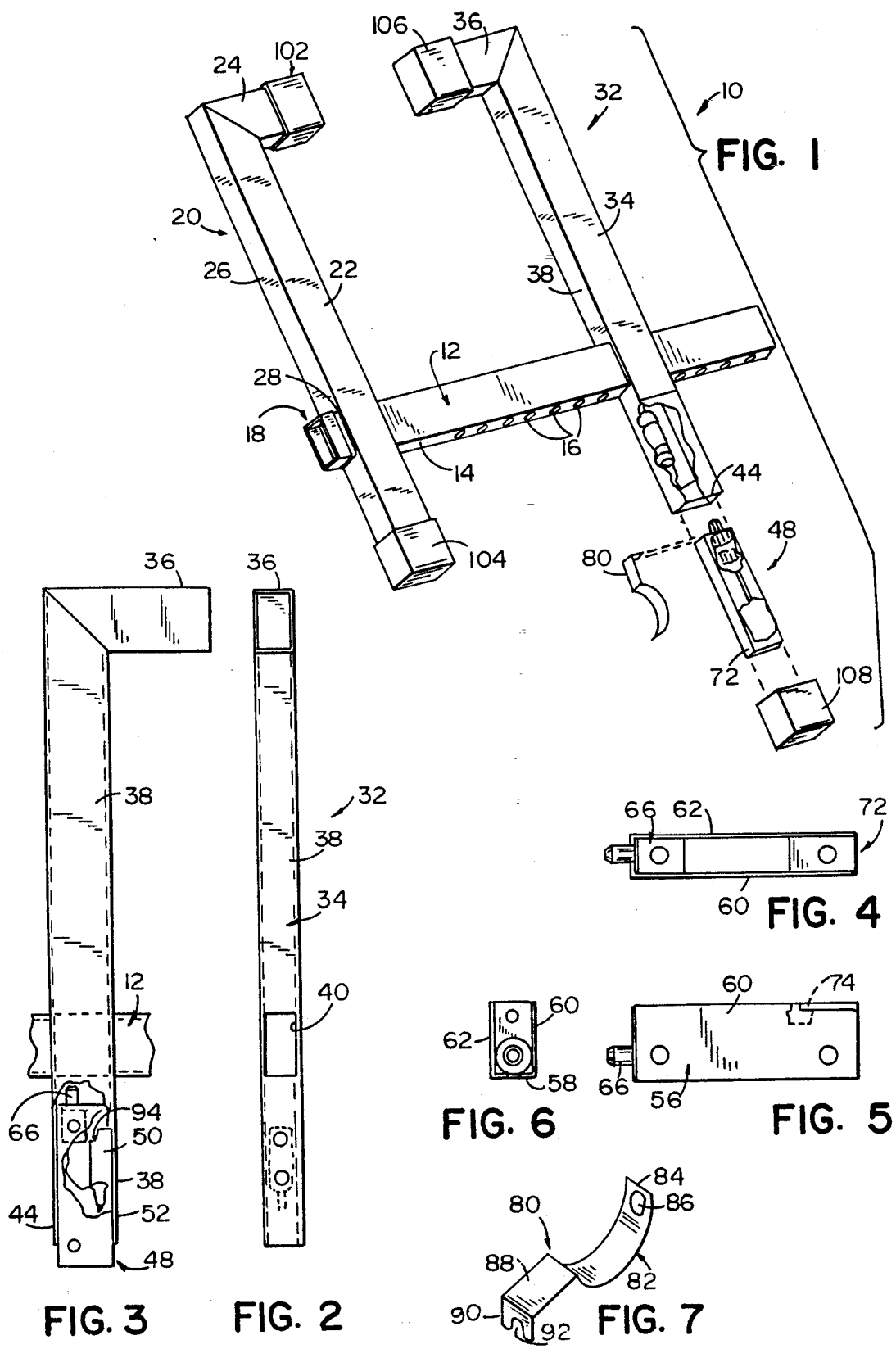

WHEEL LOCK

BACKGROUND OF THE INVENTION

The present invention relates to vehicle security and safety devices and, more particularly, to a wheel lock adapted to lock the steering wheel and/or a road wheel of a vehicle.

A wide variety of devices are available to prevent or discourage vehicle theft. Alarm systems have been proposed which sound an alarm in the event of an unauthorized entry. These systems may also disable the ignition or fuel systems of a motorized vehicle in an attempt to prevent drive-away theft. Alarm systems can be disabled and generally do not prevent tow-away theft.

Mechanical devices have been proposed to prevent movement of the vehicle or to prevent full use of the steering wheel. Mechanical devices may also be used by police enforcement agencies to prevent movement of a vehicle if it has been involved in a violation. Many of these mechanical devices clamp onto a wheel of the vehicle. If an attempt is made to drive or move the vehicle, the device will prevent wheel rotation by contacting the vehicle frame or undercarriage. Such clamp-like devices may be used on powered and nonpowered vehicles including cars, trucks, trailers, motorcycles and bicycles. Examples of such prior devices may be found in Wade U.S. Pat. No. 4,768,359 entitled WHEEL LOCK, which issued on Sep. 6, 1988; Aspell U.S. Pat. No. 4,819,462 entitled LOCKING CLAMP FOR A TRAILER TIRE-CARRYING WHEEL AND THE LIKE, which issued on Apr. 11, 1989; and Bethards U.S. Pat. No. 5,134,868 entitled WHEEL LOCKING DEVICE FOR ALL TYPES OF VEHICLES, which issued on Aug. 4, 1992.

Other mechanical devices have been proposed which attach to the vehicle steering wheel. Such devices are elongated members which limit wheel movement and, hence, restrict or limit drive-away theft.

A need exists for a vehicle security and safety device which is adapted for use with a full range of powered and nonpowered vehicles, which is usable with a steering wheel or a road wheel, which includes a lock assembly which restricts, prevents or limits tampering and which is relatively easy to manufacture and use.

SUMMARY OF THE INVENTION

In accordance with the present invention, the aforementioned needs are substantially met. Essentially, a device is provided which includes a pair of clamp members and a cross member. The clamp members are adjustably positionable on the cross member so that they may be placed about and clamped onto a wheel. The cross member defines a plurality of openings, depressions or apertures. One of the clamp members includes an open end which receives a lock assembly. The lock assembly engages the cross member at one of the apertures to lock the clamp member in position thereon.

In narrower aspects of the invention, the clamp members are generally L-shaped members and the lock assembly includes a housing slideably disposed within an end of the L-shaped member. A shackle member is fixed to an inner surface of the L-shaped member. A lock pin is fixed to the housing. The pin is dimensioned to be positionable within one of the lock apertures in the cross member. A lock is fixed to the housing and positioned to engage the shackle when the assembly is moved to a locked position. A spring retains the lock assembly within the open end of the L-shaped member and resiliently biases the lock assembly to an unlocked position.

The device in accordance with the present invention is relatively easily manufactured and used. It may be positioned on the road wheels of a powered or nonpowered vehicle. The device will prevent wheel rotation and may be used, therefore, to limit or prevent vehicle rolling while the vehicle is on a jack. The device limits wheel rotation and will engage the frame or undercarriage of the vehicle in the event that a drive-away or a tow-away is attempted. In addition, the device may be clamped about a steering wheel of the vehicle to prevent use of the wheel.

BRIEF DESCRIPTION OF THE DRAWINGS

FIG. 1 is a perspective, exploded view of a wheel lock in accordance with the present invention;

FIG. 2 is a side, elevational view of an L-shaped bar or member in the lock of FIG. 1;

FIG. 3 is a fragmentary, plan view of a portion of the device of FIG. 1;

FIG. 4 is a top view of a lock assembly incorporated in the present invention;

FIG. 5 is an elevational view of the lock assembly;

FIG. 6 is an end, elevational view of the lock assembly;

FIG. 7 is a perspective of a leaf spring incorporated in the lock assembly;

DETAILED DESCRIPTION OF THE PREFERRED EMBODIMENT

Figure 8:
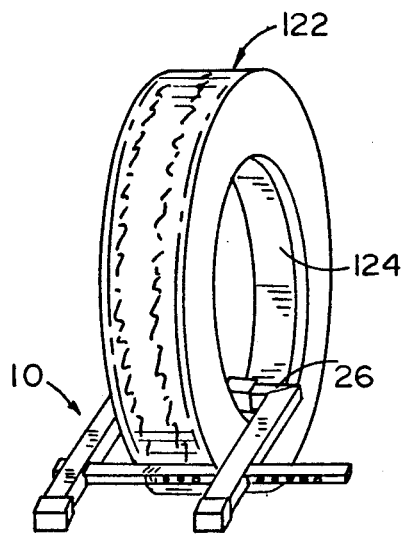
FIG. 8 is a perspective view showing a device in accordance with the present invention attached to the road wheel of a vehicle.

A vehicle wheel lock, safety or security device in accordance with the present invention is illustrated in FIG. 1 and generally designated by the numeral 10. Device 10 includes an elongated, tubular slide or cross member 12 having a rectangular configuration in cross section. Member 12 includes a side 14 which defines a plurality of longitudinally spaced lock apertures, holes or openings 16. An end 18 of cross member 12 is enlarged to define a stop.

A generally L-shaped clamp, bar or member 20 is slideably positioned on cross member 12. Bar 20 is an elongated, tubular member including a long leg 22 and a short leg 24 extending at right angles thereto. Sidewalls 26 of leg 22 define opposed apertures 28. Bar 12 is joined to bar 20 by inserting it through apertures 28 until sidewall 26 engages the enlarged end 18 of the bar.

A second L-shaped clamp, bar or member 32 is also slideably positioned on cross member 12 in opposed relationship to member 20. Member 32 is an elongated, tubular member including a long leg 34 and a perpendicular, short leg 36. As seen in FIGS. 1, 2 and 3, leg 34 includes sidewalls 38 which define aligned apertures 40. Apertures 40 are dimensioned to receive cross bar 12.

A lower end 44 of bar 32 is open to receive a lock assembly generally designated 48. A shackle member or pin 50 is welded or otherwise suitably secured to an inner surface of sidewall 38. Shackle member 50 terminates in a configured shackle pin 52.

Lock assembly 48 further includes a generally U-shaped housing 56. Housing 56 includes a base 58 and sidewalls 60, 62. A lock pin 66 is welded to housing 56 at base 58. Pin 66 includes a portion which extends outwardly from the housing. A lock 72 is welded to the opposite end of housing 56. It is presently preferred that lock 72 be a key operated lock of the type sold as a padlock and commercially available from Master Lock. Lock 72 defines a lock hole 74 for receipt of shackle pin 52. Housing 56 is dimensioned to slip-fit into open end 44 of bar 32.

As seen in FIGS. 1, 3 and 7, a leaf spring 80 is also included in lock assembly 48. Spring 80 includes a semicircular portion 82, an end 84 defining an aperture 86, a generally planar portion 88 and an end 90 defining a slot 92. As shown, aperture 86 receives shackle pin 52. Slot 92 of end 90 is disposed around lock pin 66. A portion of spring 80 engages a notch 94 defined by shackle member 50. The configuration of the spring is such that it retains the lock assembly within open end 44 of member 32. The spring also biases the lock assembly rearwardly to an unlocked position as shown in FIG. 3.

As should be apparent from FIGS. 1 and 3, member 32 is positioned on member 12 so that lock pin 66 is aligned with an aperture or lock opening 16 in cross member 12. Manually pushing the lock assembly inwardly against the resilient bias of spring 80 causes the lock pin to enter the lock opening. In addition, shackle pin 52 of the shackle member 50 enters the lock hole 74 of key lock 72. Lock 72 engages and locks onto the modified shackle member. Lock pin 66 is, therefore, locked into one of the lock apertures of the cross member. The bar 32 can no longer slide on cross member 12 relative to bar 20.

As shown in FIG. 1, bar 20 is provided with rubber end caps 102, 104. The caps cover the ends of the member 20 to prevent marring of and to protect steering wheel columns and exterior wheel rims Bar member 32 is similarly provided with a rubber end cap 106. Once lock assembly 48 is pushed to its locked position, it is fully enclosed within the open end 44 of member 32. Another end cap 108 may then be applied to end 44 to cover the lock assembly.

Figure 9:
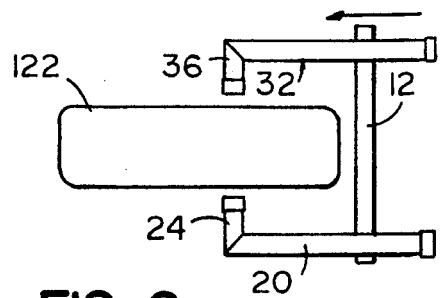
FIGS. 9 and 10 are schematic views showing the method of installation of the device to a wheel of a vehicle.
Figure 10:
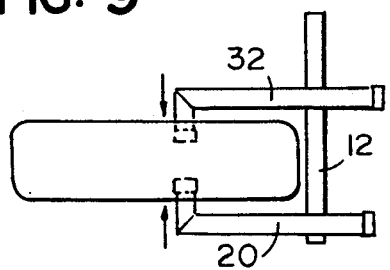

It is presently preferred that the cross bar 12 and bars 20, 32 be fabricated from hardened, heavy duty steel, such as 14 gauge steel. Lock housing 56 is also fabricated from a heavy duty, hardened steel. Spring 80 is fabricated from 301 stainless steel. Lock pin 66 and modified shackle member 50 may be fabricated from low carbon 108-110 CRS. These members may be zinc plated for corrosion protection. In addition, it is presently preferred that the cross member and L-shaped members be provided with a baked on, powder coated finish Use of the device 10 in accordance with the present invention is illustrated in FIGS. 8-10. As shown therein, with the lock assembly in its unlocked position, member 32 may be moved outwardly along cross member 12 so that opposed legs 24, 36 are sufficiently open to permit the device to be slid over a tire 122. When in position, as shown in FIG. 10, member 32 is slid toward member 20 on cross bar 12 until ends 24, 36 clampingly engage or are disposed within the confines of the wheel 124. Lock assembly 48 is then pushed to its locked position at which lock pin 66 engages an aligned lock aperture 16. Rubber cap 108 is installed upon removal of the key.

When in the position as shown in FIGS. 8 and 10, rotation of the wheel and tire assembly is limited or prevented. The device 10 will engage the undercarriage or frame of the vehicle upon tire rotation. The device will also act as a safety device to limit or prevent vehicle movement when a jack is being used or when the vehicle is parked on an incline. When device 10 is used to impede rotation when the vehicle is on a jack or on an incline, the wheel will roll tight against the cross bar 12 thereby preventing further rotation.

Figure 11:
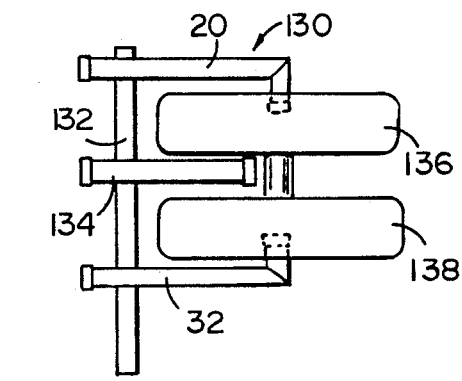
FIG. 11 is a schematic, plan view of an alternative device in accordance with the present invention installed on a dual wheel assembly.

A modified version of a device in accordance with the present invention is illustrated in FIG. 11 and generally designated by the numeral 130. Device 130 includes an elongated cross member 132 which may be dimensionally longer than cross member 12 of the embodiment of FIG. 1. Cross member 132 slideably receives a bar 20 and a bar 32 having lock assembly 48 disposed within an open end thereof. In addition, a straight tubular bar 134 is slideably positioned on cross member 132 between members 20, 32. As schematically shown in FIG. 11, device 130 is usable with a double or dual wheel assembly including wheels 136, 138. Member 20 is positioned against wheel 136. The tubular, straight member 134 is positioned between the two tires, and finally, member 32 is moved toward member 20 until the assembly is clamped onto the wheels.

Figure 12:
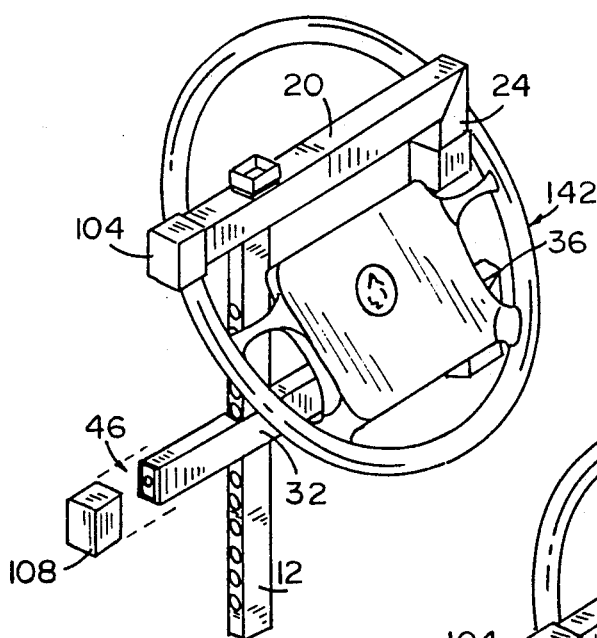
FIG. 12 is a perspective view showing a device in accordance with the present invention mounted on a vehicle steering wheel.
Figure 13:
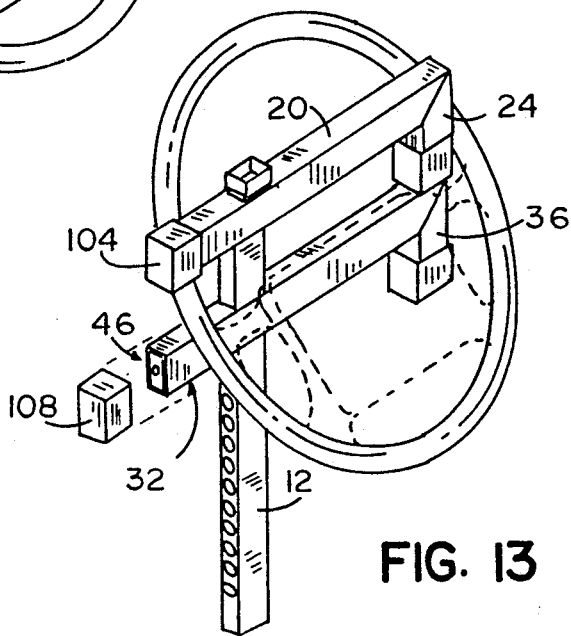
FIG. 13 is a perspective view showing an alternative method of using the device in accordance with the present invention on a steering wheel.

FIGS. 12 and 13 illustrate use of device 10 as a wheel lock on a steering wheel column. Cross member 12 is initially slid through the apertures in bar 20. The assembly is dropped into a convenient position over the steering column and yoke assembly of a steering wheel 142. Bar 32 is then slid onto cross member 12. Bar 20 may be positioned, as shown in FIG. 12, with short leg 24 in opposed relationship to short leg 36. In the alternative, bar 32 may be positioned, as shown in FIG. 13, with short leg 36 extending in the same direction as short leg 24. In either case, bar 32 is slid toward bar 20 until the lock pin is lined up with the tightest fitting hole 16. Lock assembly 48 is then moved to its locked position and rubber cap 108 is applied. When positioned as shown in FIGS. 12 or 13, full rotation of the steering wheel assembly 142 is prevented. Rotation of the wheel will cause the cross member, for example, to engage interior portions of the vehicle including the dash and door. Drive-away theft of the vehicle is, therefore, deterred.

A device in accordance with the present invention is relatively easily manufactured employing standard manufacturing techniques. The use of heavy gauge, hardened steel and an effectively armored lock will, at the very least, delay removal by a professional thief and completely discourage the casual theft. The device is readily used with any wheeled vehicle such as a car, truck, trailer, motorcycle or bicycle. The device is useable to lock a sprocket of a snowmobile track drive. The device may be applied to the steering wheel of a powered vehicle or the steering wheel of a boat. The lock is, therefore, versatile in use.

In view of the above description, those of ordinary skill in the art may envision various modifications which would not depart from the inventive concepts disclosed herein. For example, the slide or cross member could define depressions which are engaged by the lock pin. The cross member and clamps could be formed from solid bar stock with the end of one of the clamps opened to receive the lock assembly. The above description should, therefore, be considered as only that of the preferred embodiment. The true spirit and scope of the present invention may be determined by reference to the appended claims.

The embodiments of the invention in which an exclusive property or privilege is claimed are defined as follows:

1. A vehicle wheel lock, comprising:
   an elongated, tubular slide, said slide defining a stop at one end thereof;
   a pair of elongated, tubular clamps, each clamp having sidewalls defining aligned apertures, said slide extending through said clamps at said apertures, one of said clamps being positioned against said stop and the other of said clamps being moveable towards and away from said stop so that said clamps may be positioned about a wheel; and
   lock means operatively engaging said slide and said other of said clamps for locking said other of said clamps to said slide.

2. A vehicle wheel lock as defined by claim 1 wherein said lock means comprises:
   a lock housing slideably disposed within an end of said other of said clamps; and
   a lock pin fixed to said housing, said slide defining a plurality of longitudinally spaced lock apertures, said lock pin dimensioned to extend into said lock apertures.

3. A vehicle wheel lock as defined by claim 2 wherein said lock means further comprises:
   a shackle pin fixed to said other of said clamps; and
   a lock defining a lock opening dimensioned to receive said shackle pin when said housing is slid to a locked position with said lock pin disposed in one of said lock apertures.

4. A vehicle wheel lock as defined by claim 3 wherein said lock means further comprises a spring engaging said housing for resiliently biasing said housing towards an unlocked position.

5. A vehicle wheel lock as defined by claim 1 wherein said tubular clamps are generally L-shaped members, each including a long leg joined to a generally perpendicular short leg, said apertures being formed in said long leg.

6. A vehicle wheel lock as defined by claim 5 wherein said lock means is slideably disposed within an open end of said other of said clamps.

7. A vehicle wheel lock as defined by claim 6 wherein said lock means comprises:
   a generally U-shaped member slideably disposed within said open end of said other of said clamps;
   a shackle pin joined to said other of said clamps;
   a lock fixed to said U-shaped member and positioned to lockingly engage said shackle pin; and
   a lock pin fixed to said U-shaped member and dimensioned to engage said slide when said lock engages said shackle pin.

8. A vehicle wheel lock as defined by claim 7 wherein said slide defines a plurality of lock apertures dimensioned to receive said lock pin.

9. A vehicle wheel lock as defined by claim 8 wherein said lock means further comprises an elongated spring having an end engaging said lock pin and an end engaging said shackle pin, said spring configured to retain said U-shaped member within said open end of said other of said clamps.

10. A security device for a vehicle, said device comprising:
    a first generally L-shaped member having a long leg and a short leg generally perpendicular thereto, said long leg defining a transverse aperture and an end which opens into said transverse aperture;
    a cross member extending through said transverse aperture, said cross member defining a plurality of spaced lock openings facing said end;
    a second generally L-shaped member joined to said cross member, said first L-shaped member being slideable on said cross member towards and away from said second L-shaped member; and
    a lock assembly disposed within said end of said first L-shaped member for locking said first L-shaped member to said cross member.

11. A security device as defined by claim 10 wherein said lock assembly comprises:
    a housing slideably disposed within the end of said first L-shaped member;
    a shackle member fixed to said first L-shaped member and disposed within said end;
    a lock pin fixed to said housing and dimensioned to be positionable within said lock openings; and
    a lock fixed to said housing, said housing being moveable from an unlocked position to a locked position wherein said shackle member is engaged by said lock and said lock pin is disposed within one of said lock openings.

12. A security device as defined by claim 11 wherein said lock assembly further comprises a spring engaging said housing and resiliently biasing said housing to said unlocked position.

13. A security device as defined by claim 12 wherein said spring is an elongated leaf spring having an end engaging said shackle member and an end engaging said lock pin, said spring configured to retain said housing within said first L-shaped member.

14. A security device as defined by claim 10 wherein said first and second L-shaped members are hollow tubular members.

15. A security device as defined by claim 14 wherein said second L-shaped member defines aligned transverse apertures through which said cross member extends.

16. A security device as defined by claim 15 wherein said cross member defines a stop which retains said second L-shaped member on said cross member.

17. A security device as defined by claim 16 further including a plurality of end caps disposed on ends of said L-shaped members and an end of said cross member.

18. A security device as defined by claim 17 wherein said lock assembly comprises:
    a housing slideably disposed within the end of said first L-shaped member;
    a shackle member fixed to said first L-shaped member and disposed within said end;
    a lock pin fixed to said housing and dimensioned to be positionable within said lock openings; and
    a lock fixed to said housing, said housing being moveable from an unlocked position to a locked position wherein said shackle member is engaged by said lock and said lock pin is disposed within one of said lock openings.

19. A security device as defined by claim 18 wherein said lock assembly further comprises a spring engaging said housing and resiliently biasing said housing to said unlocked position.

20. A security device as defined by claim 19 wherein said spring is an elongated leaf spring having an end pin, said spring configured to retain said housing within said first L-shaped member.

* * * * *

UNITED STATES PATENT AND TRADEMARK OFFICE
CERTIFICATE OF CORRECTION

PATENT NO. : 5,315,848
DATED : May 31, 1994
INVENTOR(S) : Terrance L. Beyer

It is certified that error appears in the above-indentified patent and that said Letters Patent is hereby corrected as shown below:

Column 2, line 20;

After "member" insert --incorporated--.

Column 3, line 46;

After "rims" insert --.--.

Column 3, line 62;

After "finish" insert --.--.

Column 8, line 1, Claim 20;

After "end" insert --engaging said shackle member and an end engaging said lock--.

Signed and Sealed this

Thirteenth Day of December, 1994

Attest:

BRUCE LEHMAN

*Attesting Officer*      *Commissioner of Patents and Trademarks*